INVENTORS
ALEXANDER FEINER
ALFRED ZAROUNI
CHARLES W. ZEBE
BY
S. E. Hollander
ATTORNEY Aug. 29, 1967 A. FEINER ET AL 3,339,027

TELEPHONE LINE RANGE EXTENSION CIRCUITRY

Filed Oct. 7, 1964

5 Sheets-Sheet 2

United States Patent Office 3,339,027
Patented Aug. 29, 1967

3,339,027

TELEPHONE LINE RANGE EXTENSION CIRCUITRY

Alexander Feiner, Red Bank, Alfred Zarouni, Middletown, and Charles W. Zebe, New Shrewsbury, N.J., assignors to Bell Telephone Laboratories, Incorporated, New York, N.Y., a corporation of New York Filed Oct. 7, 1964, Ser. No. 402,081
16 Claims. (Cl. 179—16)

This invention relates to telephone systems and more particularly to telephone systems including outside plant facilities having line loops greater than a predetermined length.

In the past, telephone systems have included outside plant facilities (i.e., cables and other equipment "outside" the telephone office) which were designed, in part, in accordance with the relative distance between subscribers and the telephone central office. Because the impedance of a telephone line loop (the wire pair between the telephone substation and the office) varies in accordance with the length of the loop, it is apparent that those subscribers who are at a relatively greater distance from the office have a loop impedance substantially higher than the other customers served by the same diameter wire loops. As used herein, the term "impedance" refers to the resistance of the line and is therefore proportional to the loop length or distance from the office. Since the distance range of supervisory equipment including line relays at the office is predicated on the impedance of the majority of line loops, marginal conditions may arise with respect to the minority of subscribers whose loops exceed a predetermined length or impedance. Various ameliorative measures have been taken in the past with respect to so-called "long line" substations. These include the provision of wire pairs on "long lines" which are of greater diameter or lower gauge than the average wire pairs and, in consequence, exhibit a correspondingly reduced impedance per unit length. In those situations where it was not possible or practical to utilize lower gauge wires for long lines, specially designed long line circuits have been employed which, in effect are repeaters or amplifiers capable of responding to the reduced intensity signal from substations on long line circuits.

While wholly operative and useful, the two above-enumerated remedial measures present certain operating disadvantages. For example, in the case of the higher diameter wire which is used on long line circuits, it is apparent to those skilled in the art that cables including such higher diameter pairs will of necessity include fewer pairs per square inch of cable than the conventional pairs. In addition, it follows that the conduits or enclosures in which such cables are placed can receive a correspondingly reduced number of cables and pairs. Thus, in congested urban areas where underground conduit capacity may be fully utilized, the diameter of the cable pair forces a direct upper limit on the number of customers that may be served through a particular channel or conduit, which number, if heavier wire pairs are used, is smaller than that available through the use of conventional diameter wire pairs.

With respect to the second expedient which includes the installation of so-called long line circuits or supervisory repeating equipment, it must be observed that such facilities are customarily engrafted on an already existing system. This gives rise to a number of problems in the operation of existing switching systems, such as the No. 5 crossbar system which as part of a complicated switching sequence undertakes to examine the continuity of the telephone path to the customer substation. Since this continuity is interrupted by the interposition of the long line circuit, the customary or routine checking system is adversely affected and special facilities to compensate for this condition must be provided.

Moreover, it is apparent to those experienced in telephone switching circuits that the interposition of the long line circuit between the customer and the office precludes the desired "clean" (i.e., continuous metallic) tip and ring conductors between the substation and the office.

It is therefore an object of this invention to provide for the extension of calls to long line circuits while permitting conventional and routine tests for continuity and double connections to be completed.

Still another object of this invention is to provide for the extension of calling customer substations over long lines to dial pulse or originating registers without the necessity of intermediate pulse repeating equipment.

Still another object of this invention is to provide for the automatic inclusion of range extension circuitry in series with a long line circuit during a conversation connection.

A further object of this invention is to provide for enhanced distance range and sensitivity in a dial pulse register when connected to a long line circuit.

These and other objects and features of the invention are achieved in one specific illustrative embodiment in which a range extender circuit including an amplifier is connected in series with the link circuits extending between the primary and secondary switches of a crossbar line link frame.

The long loop customer lines are relegated to horizontal groups in the primary switch of line link frames having links which are equipped with range extension circuitry. The inclusion of the circuitry in the links permits shared usage by a relatively larger number of substation lines in lieu of the individual connection of a range extender circuit for each line.

When a service request is recognized on a calling long line, a path is extended in bypass of the range extender circuitry in a manner explained herein in detail. This path which includes a "clean" tip, ring and sleeve lead (the latter, in the office) extends from the calling line through the primary and secondary switches of the line link frame and trunk link frame to the originating register. When in the conventional operation of the marker in seizing the line link frame a test is made for an idle channel, an indication is delivered from the line link frame to the marker indicating that a long line call is in effect. As will be shown herein, the signal delivered consists of a ground indication over the contacts of a horizontal group relay. When the marker receives this indication it establishes a connection in the usual manner between the calling line and the originating register and transfers, also in the conventional manner, the line location and class-of-service information to the originating register. However, the long line indication is, in addition, transmitted to the originating register which responds by switching to a higher than normal voltage operation for dial pulsing and party test (tip or ring party identification on a party line). The higher voltage extends the resistance range of the pulsing relay or distance over which the pulsing relay and party test relay in the originating register will operate and thereby enhance the overall sensitivity of the register.

When dial pulsing is completed the originating register summons the completing marker to connect the calling line to the appropriate trunk. In establishing a connection between the selected trunk and the calling line, the completing marker seizes the line link frame to test for an idle channel between the horizontal group containing the calling line and the selected trunk. At this time the completing marker receives the long loop indication from the long line horizontal group. Thereafter, the marker establishes the connection between the calling line and the selected trunk in the conventional manner but prior to releasing from the call, the marker transmits a signal to the range extender circuit (as explained herein in detail) which removes the bypass and connects the circuit in series with the selected trunk and calling line.

These and other objects and features of the invention may be more readily comprehended from an examination of the following specification, appended claims and attached drawing, in which:

In the following description only those circuits which are essential to an understanding of the present invention are shown and described in detail. The remaining aspects of the No. 5 crossbar telephone system are disclosed comprehensively in Patent 2,585,904 of A. J. Busch of Feb. 19, 1952, which patent is herewith incorporated by reference.

*Dial tone connection*

Figure 1:
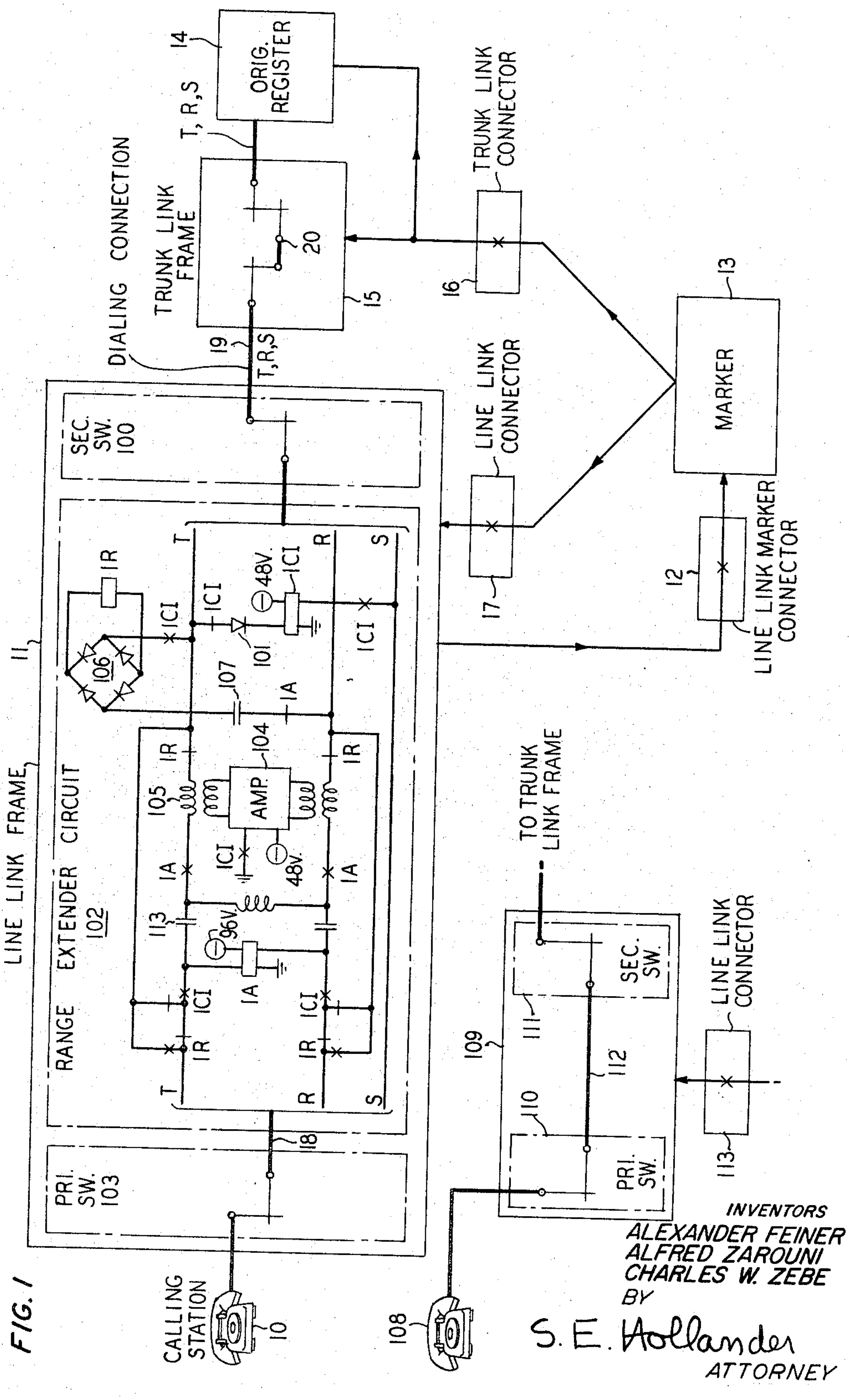
FIG. 1 shows an outline diagram of the dialing connection in a crossbar system with a detailed schematic of the range extender circuit.

Referring now to FIG. 1, a range extender circuit 102 is shown in detail therein intermediate the primary and secondary switches of a line link frame 11. The termination of substation lines on a line link frame and the trunk arrangement between line link and trunk link frames is disclosed in an article entitled "Trunking Plane for No. 5 Crossbar" by W. B. Graupner in the Bell Laboratories Record, October 1949, page 360. It is understood that substations 10, 108, etc., are representative of a larger number or full complement of stations conventionally connected to the line link frames.

When a calling subscriber at substation 10 goes off hook, a line relay, not shown herein, is operated which causes the line link frame 11 to energize the line link marker connector 12 to seize a marker 13. The line link marker connector 12 thereupon transmits to the marker 13 the equipment location of the calling line. This procedure is discussed in the above-referred-to Busch patent at column 7 et seq. During the course of the identification of the calling line a horizontal group identification is effected. The manner in which this information is delivered is shown, in part, in FIG. 4. Therein a relay 4HG indicative of the horizontal group is shown as symbolically operated by manual switch 40. The particular manner of operation of the horizontal group test relay is disclosed in the Busch patent at column 19 et seq. For convenience in placing the instant arrangement in the context of the No. 5 crossbar system described in the Busch patent, the relay reference designations in the instant arrangement include parenthetically below, the corresponding designation of the relay in the Busch disclosure together with the figure in the Busch disclosure on which the relay appears (e.g., relay 4L in the originating register of our invention is similar to relay L of FIG. 220 of the Busch patent).

Figure 4:
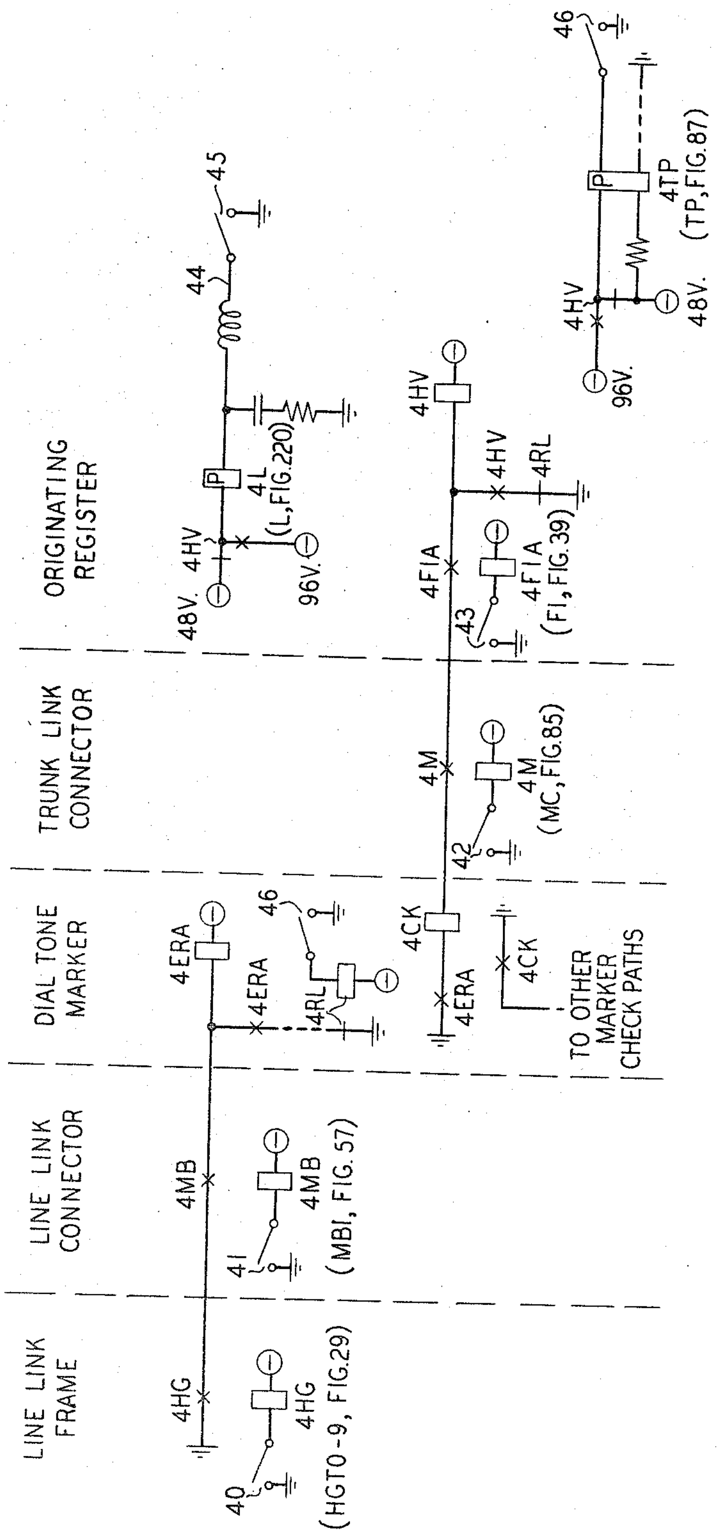
FIG. 4 shows a schematic circuit of control equipment in the crossbar system for generating "long line" signals and for responding thereto.

As shown in FIG. 4 the operation of relay 4HG initiates the delivery of a signal over the contacts of relay 4HG, contacts of relay 4MB, winding of relay 4ERA to negative battery to operate relay 4ERA, which latter is provided in the dial tone marker to signal the initiation of a long line (extended range) call. The manner of operation of relay 4MB in the line link connector is also discussed in detail in the Busch disclosure and, moreover, reference may be made to an article entitled "Connectors for the No. 5 Crossbar System" by G. S. Bishop, Bell Laboratories Record, February 1950 at page 56. For simplicity, relay 4MB is shown as being operated by a symbolic switch 41.

As indicated above, the marker records the equipment location of the calling line and also records the class of service and tests for an idle originating register, such as register 14 (FIG. 1) and for an idle channel between substation 10 and register 14.

Thereupon, the marker may select a trunk link frame 15 having an idle register 14 thereon and connects to the trunk link frame through a trunk link connector 16. In addition, the marker selects an idle channel between the customer line and the trunk link frame 15. This channel includes a line link 18, a junctor 19 and a trunk link 20. As shown in FIG. 1 the range extender circuit is serially connected to the link 18.

The marker thereupon, in accordance with conventional practice as disclosed in the above-referred-to Busch patent, delivers to the originating register 14 the identity of the line link used in the channel as well as the calling line equipment location as described in detail in the Busch disclosure at column 33 et seq. In addition, the marker, as shown in FIG. 4, delivers to the originating register a signal indicative of the initiation of the illustrative long line call by substation 10. Thus a path may be traced in FIG. 4 from ground, contacts of relay 4ERA (previously operated as described above), winding of relay 4CK, contacts of connector relay 4M, contacts of relay 4F1A, winding of relay 4HV to ground. Relay 4CK also operates in this path to check the operation of relay 4HV prior to marker release. Again, for simplicity, relays 4M and 4F1A are shown as being operated by symbolic manual switches 42 and 43. The specific manner of operation is not essential to an understanding of the present invention and reference may be made to the above-referred-to article by Bishop and the Busch patent for the detailed operation.

Also as shown in FIG. 4, the operation of relay 4HV disconnects the conventional lower voltage (48-volt battery) from the pulsing relay 4L of the originating register and instead connects a higher potential (illustratively, 96-volt battery) to the relay winding. Moreover, additional contacts of relay 4HV disconnect the 48-volt battery from the upper winding of the tip party test relay 4TP and connect a higher potential battery (illustratively 96 volts) thereto. The connection of the higher potential sources to the respective relays extends the distance (resistance) range and reliability of these relays in response to signals over extended range or long lines. Subsequently (FIG. 1), the marker 13 sets up a connecting path between the calling substation 10 and the originating register 14 by operating the select magnets and the hold magnets associated with the selected channel on the line link frame and the trunk link frame. This procedure is described, in part, at column 46 of the above-referred-to Busch disclosure.

At this time a path may now be traced from the calling substation 10, the primary switch 103, link 18, tip conductor T, contacts of relay 1R, contacts of relay 1CI, tip conductor T, secondary switch 100, junctor 19, trunk link frame 15 to the originating register 14. A similar path may be traced for the ring conductor through the range extender circuit 102. It is significant to observe that in this path no bridging impedances are present and that, in fact, a "clean" or metallic tip and ring path extends between the calling substation 10 and the originating register 14. At this time the calling long line substation may dial the digits of the called directory number. These digits are delivered, as shown in FIG. 4, over conductor 44 through the winding of relay 4L and the contacts of relay 4HV to 96-volt battery. The manner of operation of the originating register thereafter, in recording the called directory number, is conventional and is described in detail in the above-referred-to Busch disclosure at column 62 as well as in an article entitled "The Originating Dial Pulse Register Circuit for the No. 5 Crossbar System" by J. W. Dehn, Bell Laboratories Record, January 1950, page 7.

Although a pulsing relay 4L is shown, it is understood that other responsive equipment, such as TOUCH-TONE (multifrequency) receivers may be used where customers are so equipped.

Moreover, a tip party test (for party identification) may be performed in the conventional manner disclosed in detail in the Busch disclosure at column 104 et seq. which in effect checks for the existence of a ground on the tip conductor of the subscriber line. This procedure is shown symbolically by the operation of manual switch 46. For simplicity, the dial pulse signaling which is arranged to energize the pulsing relay 4L of the originating register is shown in FIG. 4 as being accomplished by switch 45.

In this manner the calling subscriber may dial the digits of the called directory number into the originating register prior to the extension of a connection through the office in response to the dialed directory number digits. It is understood that in the present arrangement the long line customers will be isolated in accordance with particular horizontal groups in order to deliver the "long line" indication shown in FIG. 4 which is effective to operate extended range relay 4ERA in the marker. If the calling line is not a long line, the respective horizontal group relay contacts will not be coupled to relay 4ERA and, as a result, relay 4HV will not be operated whereupon the originating register will function in a conventional manner from the 48-volt battery as will the tip party test relay 4TP, also over the 48-volt battery.

Thus, during the interconnection of the originating register to a line having lower than the predetermined "long line" impedance, such as line 108 of FIG. 1, the operation is in accordance with that described in the above-referred-to Busch patent and, in consequence, no signal is delivered to operate relay 4ERA in the marker. It will be seen from reference to FIG. 1 that line link 112 extends directly from primary switch 110 to secondary switch 111 of line link frame 109 and that no range extender circuitry is included therebetween. This arrangement is characteristic of the lines, such as line 108, having lower than the predetermined long line impedance.

In summary, the originating register has been modified to operate in a dual voltage mode, namely, high potential for long lines (with attendant enhanced distance range) and conventional low potential for standard impedance lines.

*Establishing an outgoing trunk connection*

Figure 2:
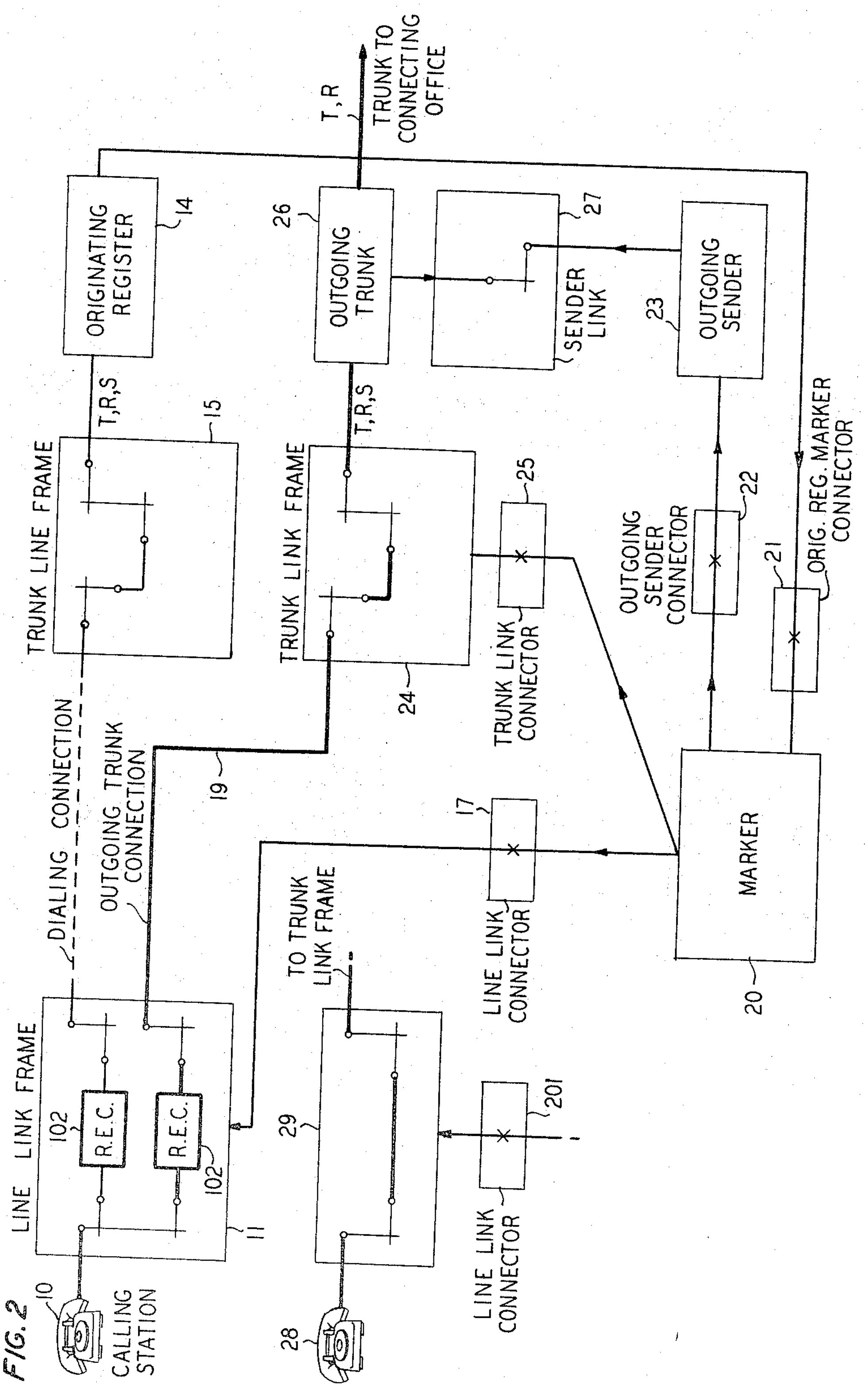
FIG. 2 shows an outline diagram of a crossbar system indicating the interposition of the range extender circuit during an outgoing calling connection.

Referring now to FIG. 2, it will be seen that when the called directory number has been stored in the originating register 14, a marker 20 is engaged by the originating register 14 over an originating register marker connector 21. This porcedure is described in the Busch disclosure at column 69 et seq. The originating register, in accordance with conventional practice, transfers to the marker 20 the equipment location and class of service of the calling substation as well as the number of the line link frame used in the dialing connection and the called directory number.

The marker 20 thereupon obtains access to an outgoing sender 23 through an outgoing sender connector 22. When the outgoing sender connector 22 is engaged, the marker 20 obtains access to an idle trunk link frame 24 by means of a trunk link connector 25. At this time the sender 23 receives the called directory number from the marker and the marker also establishes a connection between the outgoing trunk 26 extending to the desired called office and the outgoing sender 23 over the sender link 27. For an explanation of the details of appropriate senders and sender link frames, reference may be made to articles entitled, "Senders for No. 5 Crossbar," by L. T. Anderson, Bell Laboratories Record, November 1949, page 385, and "Sender Link Frames for No. 5 Crossbar," by R. A. Swift, Bell Laboratories Record, June 1950, page 258.

Figure 5:
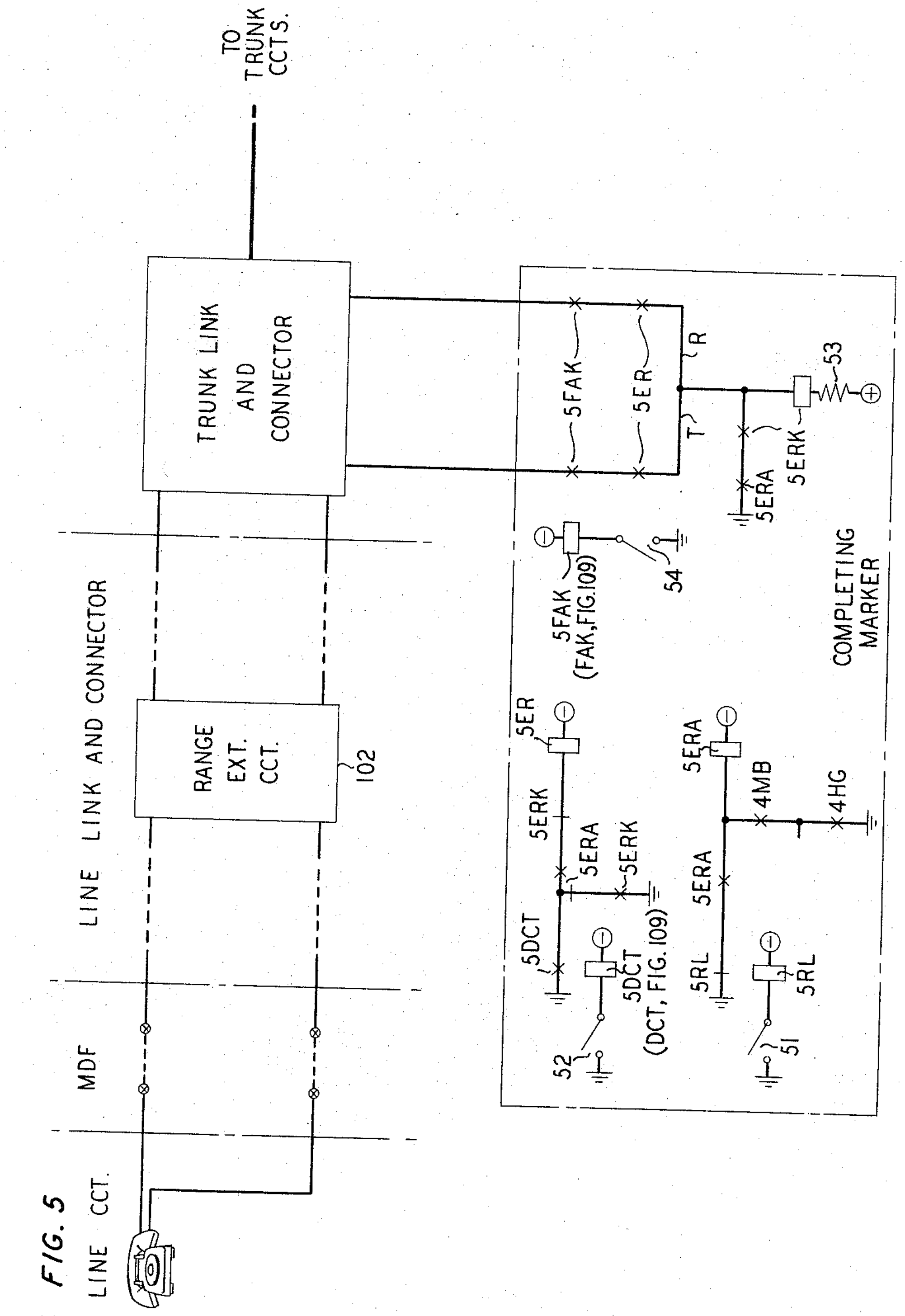
FIG. 5 shows a portion of the connection during a long line call together with control facilities in the marker for actuating the range extender circuit.

When the marker 20 seizes the trunk link frame 24, a connection is prepared between the line link frame 11 and the trunk link frame 24. Thereupon, the dialing connection previously described with respect to FIG. 1 may be released. However, in seizing the line link frame 11 to test for an idle channel between the horizontal group containing the calling line 10 and the outgoing trunk 26, the horizontal group relay is again operated as shown in FIG. 5 for the completing marker. In FIG. 5 the "completing marker" is shown as a separate entity from that of the dial tone marker, certain components of which are described in FIG. 4. In the above-referred-to Busch disclosure, the marker described is a combined marker and includes the features of both a so-called "dial tone marker" and "completing marker." For a further description of marker operation, reference may be made to an article entitled "No. 5 Crossbar Marker" by A. O. Adam, Bell Laboratories Record, November 1950, page 502.

As shown in FIG. 5, the operation of relay 4HG, the horizontal group relay in the line link frame, together with the operation of relay 4MB, the connector relay in the line link connector, causes the operation of relay 5ERA, the extended range relay in the completing marker. In each instance, with respect to relays 4ERA and 5ERA, a hold path is established over the contacts of the respective relay and the contacts of the release relay 4RL or 5RL to ground. The contacts of release relays 4RL and 5RL are operated symbolically by switch 46 for relay 4RL and switch 51 for relay 5RL.

Figure 3:
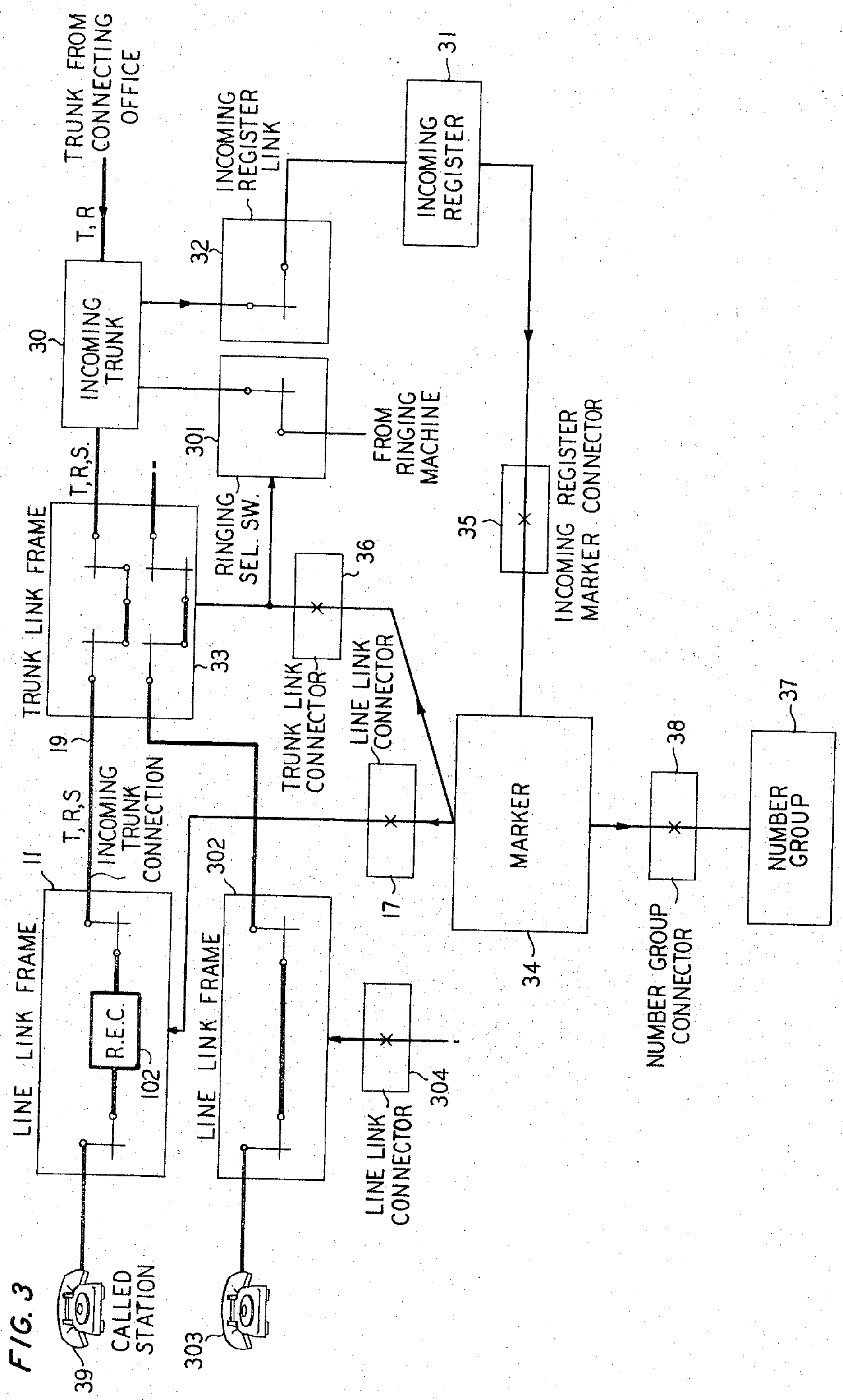
FIG. 3 shows an outline diagram of a crossbar system indicating the interposition of the range extender circuit during an incoming or terminating connection.

When the long line signal indication is delivered to the completing marker in the manner described above, the marker will proceed to establish a cross-office connection to outgoing trunk 26 in a conventional manner, as described in the above-referred-to Busch disclosure, over a path (FIG. 2) including the range extender circuit 102 of line link frame 11, junctor 19, trunk link frame 24 to the outgoing trunk 26. The range extender circuits shown in outline in FIGS. 2 and 3 are identical to that shown in FIG. 1, in detail. When the marker 20 establishes the above-described cross-office channel, it undertakes a series of tests to insure that the channel is free from cross connections, false grounds and double connections. These tests are described in detail in the Busch patent at columns 51 et seq. and 55 et seq.

When the double connection test is completed, relay 5DCT is operated as shown symbolically by switch 52. When relay 4DCT is operated, a path extends in the completing marker of FIG. 5 from ground, contacts of relays 5DCT, 5ERA (previously operated as described above), 5ERK, winding of relay 5ER to negative battery. The operation of relay 5ER extends a path (FIG. 5) from a positive 130-volt source, resistance 53, winding of relay 5ERK, contacts of relay 5ER (on both the tip and ring conductors), contacts of relay 5FAK (also in parallel) through the trunk link frame to the tip and ring conductors of the range extender circuit 102 of the line link frame shown in detail in FIG. 1. The manner of operation of relay 5FAK is not essential to an understanding of the present invention and is shown symbolically by switch 54. The specific operation is explained in the Busch patent at column 29.

The positive 130-volt potential thus applied may be traced over the tip conductor as shown in FIG. 1, contacts of relay 1CI, diode 101, winding of relay 1CI to ground. Relay 1CI operates over this path and locks operated to the conventional sleeve conductor ground over its own contacts. Operation of relay 1CI energizes amplifier 104 which may be of any suitable type and removes the bypass around the range extender amplifier at the contacts of relay 1CI. Thus a path now extends from the calling customer over primary switch 103, link 18, tip conductor T, contacts of relays IR, 1CI, capacitor 113, contacts of relay 1A, transformer 105, additional contacts of relay 1R to the secondary switch 100. A similar path may be traced over the ring conductor. Relay 5ERK is operated in series with the 130-volt source and relay 1CI over the path described above. The operation of the latter relay is an indication that the range extender circuit 102 has been introduced in series with the channel.

Line link frame 29 (FIG. 2) is typical of those line link frames which have substations, such as substation 28, terminated thereon of less than the predetermined long line impedance. As shown in FIG. 2 line link frame 29 provides a direct link between the primary and secondary switches with no range extender circuitry incorporated in the line link frame.

*Incoming trunk connection*

Referring now to FIG. 3, when an incoming trunk, such as trunk 30, is activated by a call originating at a distant office, an incoming register 31 is seized over an incoming register link 32. For a detailed explanation of the operation of the system on an incoming call, reference may be made to column 149 et seq. of the Busch disclosure. When incoming trunk 30 is seized, incoming register 31 is connected to the incoming trunk 30 and receives the called directory number digits. An additional explanation of this operation is described in articles entitled, "Incoming Register Circuits for No. 5 Crossbar," by R. K. McAlpine, Bell Laboratories Record, March 1950, page 104, and "Incoming Register Link for No. 5 Crossbar," by C. D. Koechling, Bell Laboratories Record, March 1950, page 115.

The incoming register records the number of the trunk link frame 33 on which the incoming trunk appears and after the called directory number has been registered, the incoming register 31 seizes a marker 34 over an incoming register marker connector 35 and transmits the directory number digits and the trunk link number frame to the marker 34.

The marker 34 seizes the trunk link frame 33 via the trunk link connector 36. Subsequently it seizes the appropriate number group frame 37 via the number group connector 38 (as disclosed in Busch at column 170) and translates the directory number to the called line location. Thereupon the marker 34 seizes the called line link frame 11 via the line link connector 17 and performs a line busy test of the called substation. If the called substation 39 is idle, the marker establishes a channel between trunk 30 and called station 39. In addition, the marker, from information delivered by number group 37, sets the ringing selection switch 301 to apply the appropriate ringing (Busch at column 177). Long lines will be provided with a unique ringing combination and will receive high voltage ringing and higher than normal trip battery voltage.

When the line link frame 11 is seized in the manner explained above, the marker (FIG. 5) will again receive the horizontal group indication over the contacts of relay 4HG in the manner described for an outgoing call. Here again, prior to releasing from the call, the marker performs the conventional false ground and double connection tests referred to above which result in the operation of relay 5ER. The latter relay in turn causes the actuation of relay 1CI by delivering a plus 130-volt potential to the winding of relay 1CI in series with the winding of relay 5ERK over the path described above for an outgoing connection. At this time the range extender circuit 102 is connected for amplification as shown in FIG. 1 and is in series with the link 18. Ringing may now be applied to the line in the usual manner as described in the above-referred-to Busch patent at column 100 et seq. and also in an article entitled "Ringing Selection in No. 5 Crossbar," Bell Laboratories Record, April 1950, page 168, by M. C. Goddard.

The range extender circuit (FIG. 1) is responsive to each ringing cycle as shown by a path which extends from the ring conductor R, contacts of relay 1A, capacitor 107, rectifier bridge 106, winding of relay 1R, contacts of relay 1CI to the tip conductor T. Relay 1R operates on each ringing cycle and, in consequence, bypasses the ringing signals at the contacts of relay 1R around the amplifier of the range extender. If the called substation 39 goes off hook during the ringing interval, the ringing trip relay in the incoming trunk circuit 30 (not shown) will operate in the usual manner over the contacts of relay 1R. If the called substation 39 goes off hook during the silent interval, relay 1A responds over the normally closed contacts of relay 1R and the contacts of relay 1CI to trip ringing over the contacts of relay 1A. When ringing is tripped, the called substation 39 (FIG. 3) remains connected to the incoming trunk 30 over a path including the range extender circuit 102 of line link frame 11 as well as junctor 19, trunk link frame 33 and incoming trunk 30.

In this manner the range extender circuit provides supervision (at relay 1A) and amplification (by amplifier 104) for the duration of the call.

As shown in FIG. 3, no range extender circuitry is included on terminating calls to those line link frames, such as frame 302, which include substations, such as substation 303, which have less than the predetermined loop impedance. The extension of a terminating call to substation 303 is described in detail in the above-referred-to Busch patent. It is significant to observe that line link frame 302 includes no inherent range extension circuitry between the primary and secondary switches thereof. Moreover, no horizontal group signal of the type shown in FIG. 5 is delivered during the course of the connection between the marker 34 and the line link frame 302.

It is to be understood that the above-described arrangements are illustrative of the application of the principles of the invention. Numerous other arrangements may be devised by those skilled in the art without departing from the spirit and scope of the invention.

What is claimed is:

1. A telephone switching system having a plurality of relatively high impedance lines and a plurality of lower impedance lines comprising a telephone central office, register means including a relatively high voltage source and a relatively low voltage source, means in said register means effective in response to a calling signal from a line in said plurality of high impedance lines for actuating said high voltage source to enhance the sensitivity of said register means in response to signals over said high impedance lines, and means in said register means effective in response to calling signals from said low impedance lines for coupling said low voltage source to said register means.

2. A telephone switching system having a first plurality of relatively high impedance lines and a second plurality of relatively lower impedance lines, a telephone central office, register means in said office, pulse responsive means in said register, a relatively high voltage source and a relatively lower voltage source connectable to said pulse responsive means, first relay contact means in said register means effective in response to a calling condition on one of said first plurality of lines for connecting said high voltage source to said pulse responsive means to increase the sensitivity of said register means in response to pulses over said high impedance line, and second relay contact means effective in response to a calling condition on one of said low impedance lines for connecting said low voltage source to said pulse responsive means.

3. A telephone switching system having a first plurality of relatively high impedance lines and a second plurality of relatively low impedance lines comprising a telephone central office, a first and second group of line link frames in said office, means connecting said first plurality of lines to said first group of frames, means connecting said second plurality of lines to said second group of frames, range extender means connectable in series in said line link frames of said first group, register means in said office, said register means including a relatively low voltage source and a relatively high voltage source, means in said register means effective in response to a calling signal from said second plurality of lines for controlling the actuation of said low voltage source in said register means, additional means in said register means effective in response to a calling signal on one of said first plurality of lines for actuating said higher voltage source to increase the distance range of said register in response to signals from said one line, means for coupling said one line to said register in bypass of said range extender means, and means effective during a conversation connection to said calling line for coupling said range extender means in series with said calling line.

4. A telephone switching system in accordance with claim 3 wherein said means for connecting said one line to said register in bypass of said range extender means includes relay means responsive to signals indicative of a calling condition on one of said high impedance lines.

5. A telephone switching system in accordance with claim 4 including in addition supervisory relay means in said range extender means for repeating answer and disconnect signals on said high impedance line.

6. A telephone line switching system in accordance with claim 5 wherein said line link frame includes a primary crossbar switch and a secondary crossbar switch and wherein said range extender means is connected intermediate said switches.

7. A telephone switching system having a first and second plurality of lines of relatively higher than a predetermined loop impedance and relatively lower than a predetermined loop impedance respectively, comprising a first group of line link frames connected to said first plurality of lines, a second group of line link frames connected to said second plurality of lines, means in said first plurality of line link frames including relay means representative of the horizontal group indication of said lines for generating identifying signals representative of said high impedance lines, register means including a relatively low voltage source and a relatively high voltage source, means in said register means effective in response to said identifying signals indicative of said first plurality of high impedance lines for actuating said relatively high voltage source to enhance the sensitivity of said register to signals over said high impedance lines, and means in said register effective in response to the connection of said register to said second plurality of line link frames for actuating said relatively low voltage source in said register.

8. A telephone switching system including a first and second plurality of lines having higher than a predetermined loop impedance and lower than a predetermined loop impedance respectively, comprising a first plurality of line link frames connected to said first plurality of lines, a second plurality of line link frames connected to said second plurality of lines, means in said first plurality of line link frames for generating signals indicative of said high impedance lines, register means including a relatively high voltage source and a relatively low voltage source, marker means responsive to the generation of an identifying signal representative of said first plurality of lines for transmitting said signal to said register means, means in said register means effective in response to said signal for actuating said relatively high voltage source to increase the range of said register in response to signals over said high impedance lines, and means in said register means effective in response to calling conditions on said second plurality of lines for actuating said low voltage source.

9. A telephone switching system having a first group of lines with higher than a predetermined loop impedance and a second group with less than a predetermined loop impedance comprising a telephone central office, a first line link frame in said office connectable to said first plurality of lines, a second line link frame in said office connectable to said second plurality of lines, means in said first line link frame effective in response to a calling condition on one of said lines connected thereto for generating a signal indicative of said high loop impedance, an originating dial pulse register including a relay having relatively high and lower voltage sources connectable thereto for receiving dial pulses from said lines, marker means in said office for controlling the connection of said line link frames to said originating register, means in said marker means effective during the connection of said first line link frame to said originating register for receiving said signal indicative of said high loop impedance, means in said register responsive to the reception of said signal indication in said marker means for coupling said high voltage source to said register relay to enhance the sensitivity of said originating register in response to dial pulses over said high impedance line, and additional means in said register effective in response to the coupling of said second line link frame to said register to control the actuation of said low voltage source in said originating register.

10. A telephone switching system in accordance with claim 9 wherein said means in said first line link frame for generating a signal indicative of said high loop impedance includes horizontal group relay means operative in response to the particular horizontal group identification of said calling line.

11. A telephone switching system in accordance with claim 10 wherein said means in said marker for receiving said signal indicative of said high loop impedance includes extended range relay means operative in response to the energization of said horizontal group relay means.

12. A telephone switching system in accordance with claim 11 wherein said means in said register for actuating said high voltage source includes switching relay means responsive to the operation of said extended range relay means.

13. A telephone switching system having a first plurality of lines of a higher than predetermined loop impedance and a second plurality of lines of lower than a predetermined loop impedance comprising a telephone central office, a first plurality of line link frames in said office connected to said first plurality of lines, a second plurality of line link frames in said office connected to said second plurality of lines, said line link frames including primary switches and secondary switches, range extender means interposed between said switches of said first plurality of line link frames, originating register means in said office having a relatively high and a relatively lower voltage source, marker means in said office for controlling the connection of said first plurality of line link frames to said originating register in bypass of said range extender means in response to a calling condition on one of said high impedance lines, relay means in said first plurality of line link frames responsive to a calling condition on one of said high impedance lines for generating a characteristic signal indication, said marker means including additional relay means responsive to the reception of said characteristic signal indication, switching means in said register responsive to the operation of said marker relay means for actuating said high voltage source to enhance the sensitivity of said register means in response to dial pulses over said high impedance lines, a trunk circuit in said office, means in said marker means effective during the connection of said first plurality of line link frames to said trunk circuit for delivering a signal to said range extender means to connect said range extender means in circuit between said primary and secondary switches, and means in said register means effective in response to calling conditions on said lower impedance lines for governing the actuation of said low voltage source in said register means.

14. A crossbar telephone switching system including a first and second plurality of lines having greater than a predetermined loop impedance and less than a predetermined loop impedance respectively, comprising a telephone central office, a first plurality of line link frames connectable to said first plurality of lines, a second plurality of line link frames connectable to said second plurality of lines, said frames including primary crossbar switching means and secondary crossbar switching means, range extender means connectable in series with said switching means of said first plurality of line link frames, said range extender means including direct-current supervisory means and alternating-current amplifier means, originating register means having a relatively higher and low voltage source, marker means for controlling the extension of a connection between said lines and said register means, a trunk circuit in said office, means in said first plurality of line link frames responsive to a calling signal on one of said high impedance lines for transmitting a particular signal indication to said marker means, additional means in said marker means responsive to said particular signal indication for energizing said high voltage source to enhance the sensitivity of said register in response to pulses over said high impedance lines, means in said range extender means effective during the connection of said first plurality of line link frames to said originating register for shunting said supervisory means and said amplification means, additional means in said marker means effective during the extension of a connection from said first plurality of line link frames to said trunk circuit including means for controlling the serial connection of said supervisory and amplifier means in circuit, and means in said originating register effective during the connection of said second plurality of line link frames to said register for actuating said low voltage source.

15. A crossbar telephone switching system in accordance with claim 14 wherein said means for controlling the connection of said range extender means in circuit includes cut-in relay means responsive to said particular signal indication for serially coupling said range extender means between said primary and secondary crossbar switching means.

16. A crossbar telephone switching system including a first plurality of lines having higher than a predetermined loop impedance and a second plurality of lines having lower than a predetermined loop impedance respectively, comprising a telephone central office, a first plurality of line link frames in said office connectable to said first plurality of lines, a second plurality of line link frames in said office connectable to said second plurality of lines, range extender means in said first plurality of line link frames, said range extender means including supervisory means and amplifier means, ringing selection means in said office, and relay means in said first plurality of line link frames effective in response to ringing signals from said ringing selection means during a terminating call to said high impedance lines for shunting said ringing signals around said supervisory and amplifier means.

References Cited

UNITED STATES PATENTS

| | | | |
|---|---|---|---|
| 2,853,552 | 9/1958 | Oberman | 179—22 X |
| 2,993,092 | 7/1961 | Herbig et al. | 179—18.3 |
| 3,187,104 | 6/1965 | Ebel | 179—16.5 |

KATHLEEN H. CLAFFY, *Primary Examiner.*

L. A. WRIGHT, *Assistant Examiner.*